US010718390B2

(12) United States Patent
Matsui et al.

(10) Patent No.: US 10,718,390 B2
(45) Date of Patent: Jul. 21, 2020

(54) ABNORMALITY DETECTION DEVICE FOR AUTOMATIC TRANSMISSION

(71) Applicants: JATCO Ltd, Fuji-shi, Shizuoka (JP); NISSAN MOTOR CO. LTD., Yokohama-shi, Kanagawa (JP)

(72) Inventors: Junki Matsui, Isehara (JP); Masahiro Hamano, Atsugi (JP); Norihira Amano, Fuji (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 150 days.

(21) Appl. No.: 16/077,829

(22) PCT Filed: Feb. 16, 2017

(86) PCT No.: PCT/JP2017/005785
§ 371 (c)(1),
(2) Date: Aug. 14, 2018

(87) PCT Pub. No.: WO2017/142046
PCT Pub. Date: Aug. 24, 2017

(65) Prior Publication Data
US 2020/0025266 A1    Jan. 23, 2020

(30) Foreign Application Priority Data
Feb. 19, 2016    (JP) ................................. 2016-030096

(51) Int. Cl.
*F16D 48/06*    (2006.01)
*F16D 25/12*    (2006.01)
*G07C 5/08*    (2006.01)

(52) U.S. Cl.
CPC ........... *F16D 48/068* (2013.01); *F16D 25/12* (2013.01); *G07C 5/0808* (2013.01); *F16D 2500/302* (2013.01); *F16D 2500/7041* (2013.01)

(58) Field of Classification Search
CPC ..... F16H 2061/1284; F16H 2061/1204; F16D 48/068; F16D 2500/3041; F16D 2500/30401
See application file for complete search history.

(56) References Cited

U.S. PATENT DOCUMENTS

| 2004/0162661 A1* | 8/2004 | Kikuchi | ................. B60K 37/06 |
| | | | 701/62 |
| 2012/0108391 A1* | 5/2012 | Nagashima | .............. B60K 6/48 |
| | | | 477/176 |
| 2014/0025269 A1* | 1/2014 | Ayabe | ..................... F16H 61/12 |
| | | | 701/60 |

FOREIGN PATENT DOCUMENTS

JP    H07-301313 A    11/1995

OTHER PUBLICATIONS

International Search Report dated May 16, 2017 in the International Application No. PCT/JP2017/005785.

* cited by examiner

*Primary Examiner* — Kenneth J Malkowski
(74) *Attorney, Agent, or Firm* — Foley & Lardner LLP

(57) ABSTRACT

Abnormality detection device for automatic transmission of invention has automatic transmission 5A connected to vehicle driving source 1, 3 through clutch 4a; range detector detecting selection range of selector lever 9 and outputting detection signal; manual valve 90 configured to, when selector lever is positioned at drive range position, engage clutch and bring automatic transmission into power transmission state, and when selector lever is positioned at range position except drive range position, disengage clutch and bring automatic transmission into power non-transmission state. Device further has engagement control unit 10B controlling clutch from disengagement state toward engagement direction when no-signal state in which signal is not outputted from range detector continues for first predetermined time or more; engagement judgment unit 10C judging engagement of clutch during engagement control; and abnormality determination unit 10D determining, when engagement is judged, that range detector is in no-signal abnormality indicating that no signal is outputted.

6 Claims, 5 Drawing Sheets

ABNORMALITY DETECTION DEVICE FOR AUTOMATIC TRANSMISSION

The present invention relates to an abnormality detection device for an automatic transmission, which detects no-signal abnormality (signal-absence abnormality) of a range detector provided at a selector lever of the automatic transmission.

BACKGROUND ART

An automatic transmission mounted in a vehicle is provided with a selector lever that is operated by a driver. And, a shift control device (a change-speed control device) controls shift (speed) of the automatic transmission according to a selection range selected by the selector lever.

The automatic transmission is provided with a range detector called an inhibitor switch which when the selector lever is operated to any range position of D, N, R, P etc., detects its selection range and outputs a selection range signal of the detected selection range.

With regard to the selector lever, a manual valve, which changes a shift state of the automatic transmission by changing a hydraulic pressure supply passage leading to the automatic transmission, is connected to the selector lever so as to mechanically work with or synchronize with the selector lever.

The shift control device controls the shift of the automatic transmission according to the selection range signal sent from the inhibitor switch. However, when the inhibitor switch is in an abnormal state, the shift control device controls the automatic transmission by a fail-safe control executed for this abnormal state. Thus, it is necessary to judge whether the inhibitor switch is in the abnormal state or in a normal state.

As the abnormality of the inhibitor switch, there is a no-signal abnormality (a signal-absence abnormality) that indicates that a detection signal is not outputted from the inhibitor switch. A main cause of this no-signal abnormality is poor contact (contact failure) of electric contact provided at each range position of D, N, R, P etc. and breakage of an electric signal line.

However, even if the poor contact or the breakage does not occur in the inhibitor switch, when the selector lever is positioned at a middle position (hereinafter, called a middle range position) between adjacent two range positions, the detection signal is not outputted from the inhibitor switch. Because of this, it is not always possible to judge, by the fact that the detection signal is not outputted from the inhibitor switch, that the inhibitor switch fails.

Under the circumstances, for instance, Patent Document 1 proposes a technique that judges that if a state in which the detection signal is not outputted from the inhibitor switch continues for a predetermined time, the inhibitor switch is in a state of the no-signal abnormality.

That is, a state in which the selector lever is positioned at the middle range position is a state in which the operation of the selector lever by the driver is in progress. And, this state continues only for a few time (a few seconds) (e.g. 1 to 2 sec.) in a normal operation. However, in a case where the driver stops the selector lever operation in the middle of the range selection operation, the state of the middle range position continues for a time that is longer than this few time.

However, since it is assumed that a duration time (or a continuation time) of this case also has a limitation (e.g. about a few tens of seconds), if a state in which the detection signal is not outputted from the inhibitor switch continues for a predetermined time determined based on this limitation, the technique judges that the inhibitor switch is in the no-signal abnormality state.

In the above technique, however, even in a case where the inhibitor switch is really in the no-signal abnormality state, the abnormality of the inhibitor switch is not determined (fixed or ascertained) until the predetermined time elapses. Because of this, execution of the fail-safe control is delayed for this predetermined time.

For this reason, it is desirable to shorten a time required to determine the no-signal abnormality of the inhibitor switch as much as possible. Especially when the vehicle travels, it is desirable to shorten the time required to determine the abnormality then to shift the control to the fail-safe control in as short a time as possible.

CITATION LIST

Patent Document

Patent Document 1: Japanese Unexamined Patent Application Publication No. JPH07-301313

SUMMARY OF THE INVENTION

The present invention was made in view of the above technical problem. An object of the present invention is therefore to provide an abnormality detection device for the automatic transmission which is capable of shorten a time required to determine the no-signal abnormality of the range detector (the inhibitor switch) as much as possible.

(1) As one aspect of the present invention, an abnormality detection device for an automatic transmission, which detects abnormality of a range detector, comprises: an automatic transmission connected to a driving source of a vehicle through a clutch; a range detector that, when a selector lever of the automatic transmission is operated to any range position, detects a selected range and outputs a detection signal; a manual valve that works with the selector lever, the manual valve configured to, when the selector lever is positioned at a drive range position, engage the clutch and bring the automatic transmission into a power transmission state, and when the selector lever is positioned at a range position except the drive range position, disengage the clutch and bring the automatic transmission into a power non-transmission state; an engagement control unit configured to, when a no-signal state in which the signal is not outputted from the range detector continues for a first predetermined time or more, control engagement of the clutch from a disengagement state toward an engagement direction; an engagement judgment unit configured to judge the engagement of the clutch during execution of the engagement control; and an abnormality determination unit configured to, when it is judged that the clutch is engaged by the engagement judgment unit, determine that the range detector is in a no-signal abnormality that indicates that no signal is outputted from the range detector.

(2) It is preferable that the engagement control includes a backlash elimination control that eliminates backlash of the clutch and a slip control that slip-engages the clutch after the backlash elimination control, and when the engagement judgment unit determines that the clutch is in a slip-engagement state, the engagement judgment unit judges that the clutch is engaged.

(3) It is preferable that by a fact that a state in which an output torque of the driving source changes as compared with an output torque of the driving source before performing the engagement control continues for a second predetermined time or more after judgment of a start of the slip-engagement of the clutch, the engagement judgment unit determines that the clutch is in the slip-engagement state.

(4) It is preferable that by a fact that a rotation speed of the driving source decreases to a predetermined rotation speed or less after judgment of a start of the slip-engagement of the clutch, the engagement judgment unit determines that the clutch is in the slip-engagement state.

(5) It is preferable that the driving source is an electric motor, and the abnormality detection device further comprises a motor control unit configured to control the electric motor, and the motor control unit operates the electric motor during execution of the engagement control, and when a rotation speed of the electric motor decreases during operation of the electric motor, the motor control unit performs a feedback control so as to recover the rotation speed of the electric motor.

(6) It is preferable that when the no-signal state in which the signal is not outputted from the range detector continues for a third predetermined time, which is longer than the first predetermined time, or more, even if the engagement of the clutch is not judged by the engagement judgment unit, the abnormality determination unit determines that the range detector is in the no-signal abnormality that indicates that no signal is outputted from the range detector.

According to the present invention, when the no-signal state in which the signal is not outputted from the range detector continues for the first predetermined time or more, engagement of the clutch is controlled from the disengagement state toward the engagement direction. And, during execution of this engagement control, when it is judged that the clutch is engaged, the unit determines that the range detector is in the no-signal abnormality that indicates that no signal is outputted from the range detector.

The no-signal state occurs when the no-signal abnormality occurs in the range detector, and when the selector lever is positioned at the middle range position. Since if the selector lever is positioned at the middle range position, the manual valve is positioned at a position where hydraulic pressure is not (or cannot be) supplied to the clutch, even if the engagement control is performed, the clutch is not engaged. On the other hand, when the no-signal abnormality occurs in the range detector and the selector lever is positioned at the drive range position, the manual valve is positioned at a position where the hydraulic pressure can be supplied to the clutch, and this allows clutch engagement. Therefore, when the engagement control is performed, the clutch is engaged. With this, it is possible to judge the no-signal abnormality of the range detector.

Here, the first predetermined time can be set on the basis of a time for which the selector lever is positioned at the middle range position in a normal operation by the driver without consideration of a case where the driver stops the selector lever operation in the middle of the range selection operation. And, the first predetermined time can be set to a relatively short time. Therefore, it is possible to shorten a time required to determine the no-signal abnormality of the range detector.

BRIEF DESCRIPTION OF DRAWINGS

FIG. 4 shows a case where the abnormality judgment is made from a change state of an output torque of a driving source.

FIG. 5 shows a case where the abnormality judgment is made from a decrease in a rotation speed of the driving source.

EMBODIMENTS FOR CARRYING OUT THE INVENTION

In the following description, an embodiment of the present invention will be explained with reference to the drawings. Here, the embodiment explained below is one of examples of the present invention, and there is no intention of excluding application of various modifications and techniques which are not explicitly shown in the following description. Each structure or configuration of the following embodiment includes all design modifications and equivalents belonging to the technical scope of the present invention. Further, each structure or configuration of the following embodiment can be employed or removed selectively, or can be combined as necessary.

[1. General System Configuration]

Figure 1:
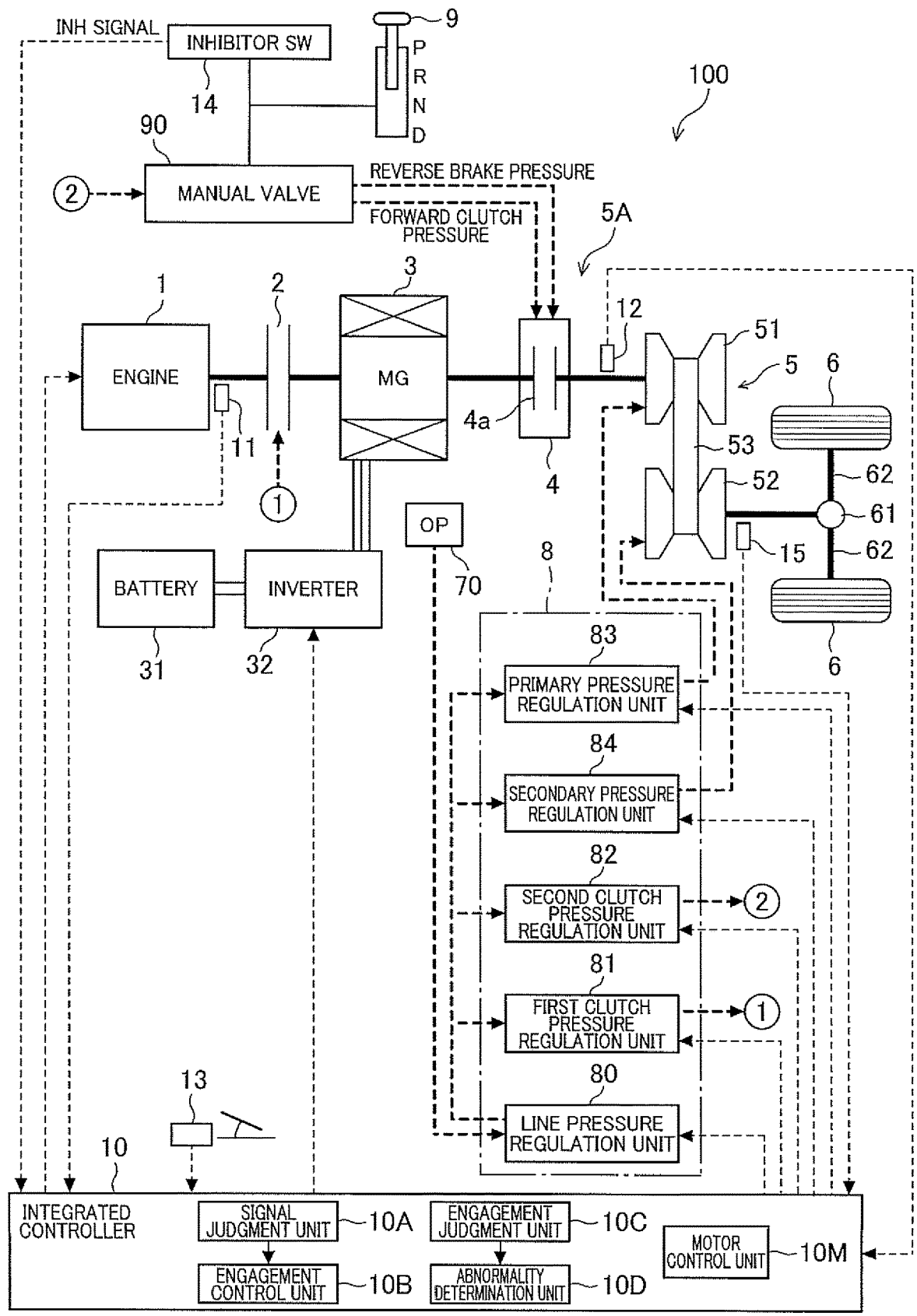
FIG. 1 is a general system diagram of a hybrid vehicle and its control device, according to an embodiment of the present invention.

FIG. 1 is a general system diagram of a hybrid vehicle (hereinafter, called vehicle) and its control device, according to the present embodiment. A vehicle 100 and its control device will be explained on the basis of this FIG. 1.

As shown in FIG. 1, the vehicle 100 has an engine 1, a mode switch clutch (a first clutch) 2, a motor/generator (hereinafter, called MG) 3 having functions of an electric motor and a generator, an automatic transmission 5A configured from a forward-reverse switching mechanism 4 and a continuously variable transmission mechanism (hereinafter, called variator) 5, driving wheels 6 and an integrated controller 10.

The engine 1 is an internal combustion engine working using gasoline etc. as fuel. A rotation speed, torque etc. of the engine 1 are controlled on the basis of an engine control command from the integrated controller 10.

The mode switch clutch 2 is a normally-open hydraulic driven clutch interposed between the engine 1 and the MG 3. Engagement and disengagement states of this mode switch clutch 2 are controlled by a control pressure produced by a first clutch pressure regulation unit 81 of a hydraulic pressure control valve unit 8 on the basis of a mode switch command from the integrated controller 10. As the mode switch clutch 2, for instance, a dry-type multiple disc clutch is used.

The MG 3 is a synchronous electric motor in which a permanent magnet is embedded in a rotor and a stator coil is wound around a stator. The MG 3 is controlled by application of a three-phase alternating current that is generated by an inverter 32 by receiving power supply from a battery 31 on the basis of an MG control command from a motor control unit (a motor control means) 10M of the integrated controller 10.

The MG 3 acts as the generator that generates electromotive force at both ends of the stator coil when the rotor receives a rotation energy from the engine 1 or the driving wheels 6, and is able to charge the battery 31. Further, when the automatic transmission 5A is in a neutral state, the MG 3 is rotation-controlled so as to follow a rotation of the driving wheels 6, then an output torque of the MG 3 is suppressed.

The forward-reverse switching mechanism 4 is interposed between the MG 3 and the variator 5. As a configuration of the forward-reverse switching mechanism 4, the forward-reverse switching mechanism 4 has a planetary gear, a forward clutch (FWD/C) and a reverse brake (RWV/B), although a detailed explanation is omitted here. These forward clutch and reverse brake are a start clutch (a second clutch) 4a that is interposed between the driving source (the engine 1 and the MG 3) and the automatic transmission (the forward-reverse switching mechanism 4 and the variator 5). This second clutch 4a corresponds to a clutch of the present invention.

The planetary gear is configured by a sun gear, a pinion gear, a ring gear and a carrier. A rotation shaft of the ring gear is connected to an input shaft of the variator 5, and a rotation shaft of the sun gear is connected to an output shaft of the MG 3.

The forward clutch is a clutch that connects the sun gear and the carrier by engagement of the forward clutch. The reverse brake is a brake that, by engagement of the reverse brake, connects the carrier to a transmission case such that the carrier is not able to relatively rotate.

When engaging the forward clutch and disengaging the reverse brake, rotation of the engine 1 and the MG 3 is transmitted to the variator 5 as it is, and a forward state is realized. When disengaging the forward clutch and engaging the reverse brake, the rotation of the engine 1 and the MG 3 is transmitted to the variator 5 with the rotation being decelerated and reversed, and a reverse state is realized.

Engagement and disengagement of these forward clutch and reverse brake are controlled by a control pressure produced by a second clutch pressure regulation unit 82 of the hydraulic pressure control valve unit 8 on the basis of a forward/reverse switch command from the integrated controller 10. As the forward clutch and the reverse brake, for instance, a normally-open wet-type multiple disc clutch is used.

The variator 5 is disposed at a downstream side of the MG 3, and continuously changes or varies a transmission ratio according to a vehicle speed and an accelerator opening degree etc. The variator 5 has a primary pulley 51, a secondary pulley 52 and a belt 53 wound around both the primary pulley 51 and the secondary pulley 52.

The primary pulley 51 and the secondary pulley 52 continuously change or vary the transmission ratio by changing or varying pulley contact radii of the belt 53 by moving a movable pulley of the primary pulley 51 and a movable pulley of the secondary pulley 52 in their axial directions by a primary pulley pressure and a secondary pulley pressure produced by a primary pressure regulation unit 83 and a secondary pressure regulation unit 84 of the hydraulic pressure control valve unit 8 respectively.

The hydraulic pressure control valve unit 8 has a line pressure regulation unit 80 that regulates a discharge pressure from an oil pump 70 to a line pressure. The first clutch pressure regulation unit 81, the second clutch pressure regulation unit 82, the primary pressure regulation unit 83 and the secondary pressure regulation unit 84 produce their respective pressures with the line pressure regulated by the line pressure regulation unit 80 being an initial pressure.

A differential gear 61 is connected to an output shaft of the variator 5 through a final speed reduction gear mechanism (not shown). And, the driving wheels 6 are connected to the differential gear 61 through drive shafts 62.

The integrated controller 10 is a computer having CPU that executes various processing and controls, ROM that stores program and data for the controls, RAM that temporarily stores a processing result by the CPU and so on, input and output ports for inputting and outputting signal with an external unit or device, and a timer that counts time.

The integrated controller 10 inputs each signal from a rotation speed sensor 11 that detects the rotation speed of the engine 1, a rotation speed sensor 12 that detects an output rotation speed of the forward-reverse switching mechanism 4 (=an input rotation speed of the variator 5), an accelerator opening sensor 13 that detects the accelerator opening degree, an inhibitor switch (a range detector) 14 that detects a selection position of a selector lever 9 (a position state of the selector lever 9 that switches between a forward, a reverse, a neutral and a parking), a vehicle speed sensor 15 that detects the vehicle speed, and so on. The integrated controller 10 then performs each control for the engine 1, the MG 3 (the inverter 32) and the automatic transmission 5A on the basis of these input signals.

Further, the integrated controller 10 switches between an EV mode and a HEV mode that are driving modes of the vehicle 100.

The EV mode is a mode (a motor-solely-used drive mode) in which the vehicle travels with the mode switch clutch 2 disengaged and with only the MG 3 being the driving source. The EV mode is selected when a required driving force is low (small) and a charge amount of the battery 31 is sufficient.

The HEV mode is a mode in which the vehicle travels with the mode switch clutch 2 engaged and with the engine 1 and the MG 3 being the driving source. The HEV mode is selected when the required driving force is high (large) or when the charge amount of the battery 31 is insufficient.

As the driving mode of the vehicle 100, there are a mode (an engine-solely-used drive mode) in which the vehicle travels with the mode switch clutch 2 engaged and with only the engine 1 being the driving source and with the MG 3 being in a no-load state, and a mode (a power-generation drive mode) in which the vehicle travels with the mode switch clutch 2 engaged and with the MG 3 being in a power-generation state while using a driving torque of the engine 1 as a driving force of the vehicle and a power-generation driving force of the MG 3.

Here, since the vehicle 100 of the present embodiment is not provided with a torque converter, the vehicle 100 starts while slip-engaging the start clutch (the forward clutch or the reverse brake) 4a when starting. However, the vehicle 100 could be provided with the torque converter.

[2. Configuration of Selector Lever]

Here, the selector lever (also called a shift lever) 9 to switch (select) a shift state (a speed state) of the automatic transmission 5A will be explained with reference to FIG. 2.

Figure 2:
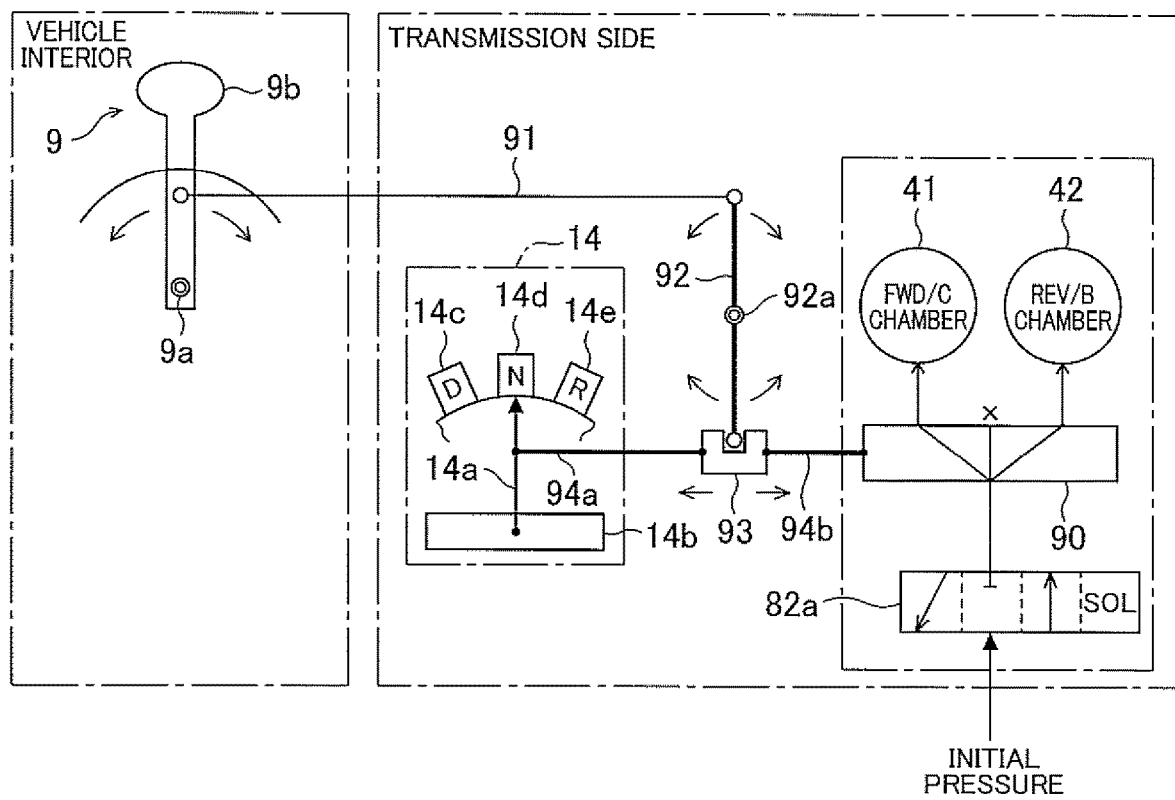
FIG. 2 is a schematic diagram showing a configuration of a selector lever of an automatic transmission, according to the embodiment of the present invention.

FIG. 2 is a schematic diagram showing the configuration of the selector lever 9. As shown in FIG. 2, the selector lever 9 is rotatably (pivotally) provided with a fulcrum 9a being a center. One end of a wire 91 is connected to the selector lever 9 at an operating portion 9b side with respect to the fulcrum 9a. The other end of the wire 91 is connected to a link 92. The link 92 is rotatably (pivotally) provided with a fulcrum 92a being a center. The other end of the link 92 is connected to a slider 93.

The slider 93 is connected to a switch portion 14a of the inhibitor switch 14 through a connecting rod 94a. In the present embodiment, the inhibitor switch 14 has a sector shape, and a D-range terminal 14c, an N-range terminal 14d and an R-range terminal 14e etc. are arranged on the same arc. The switch portion 14a connects any one of these terminals and a power supply terminal 14b and allows electrical conduction between them.

When the selector lever 9 is operated as shown by arrows by the driver, the link 92 rotates (pivots) as shown by arrows through the wire 91, and the slider 93 moves as shown by arrows. The switch portion 14a moves with the movement of this slider 93, and brings the power supply terminal 14b and any one of the D-range terminal 14c, the N-range terminal 14d and the R-range terminal 14e into conduction.

Further, the slider 93 is connected to a manual valve 90 through a connecting rod 94b that is different from the above connecting rod 94a. Then, the movement of the selector lever 9 is transmitted to the manual valve 90 by a mechanical link mechanism (the wire 91, the link 92, the slider 93 and the connecting rod 94b).

The manual valve 90 shifts by and according to the movement of the selector lever 9. The manual valve 90 can shift to a position at which a hydraulic pressure (a forward clutch pressure or a reverse brake pressure) regulated by an electromagnetic valve 82a of the second clutch pressure regulation unit 82 can be selectively supplied to either one of a hydraulic chamber (FWD/C hydraulic chamber) 41 for engaging and disengaging the forward clutch of the forward-reverse switching mechanism 4 and a hydraulic chamber (REV/B hydraulic chamber) 42 for engaging and disengaging the reverse brake of the forward-reverse switching mechanism 4, or a position at which a hydraulic pressure is discharged from the both hydraulic chambers 41 and 42 (supply of the hydraulic pressure to the both hydraulic chambers 41 and 42 is interrupted).

That is, when the selector lever 9 is operated and positioned at the D-range position, the slider 93 works with this operation and moves the manual valve 90, then the manual valve 90 shifts to a state in which the forward clutch pressure is supplied to the FWD/C hydraulic chamber 41. Further, when the selector lever 9 is operated and positioned at the R-range position, the slider 93 works with this operation and moves the manual valve 90, then the manual valve 90 shifts to a state in which the reverse brake pressure is supplied to the REV/B hydraulic chamber 42.

However, when the selector lever 9 is positioned at the N-range position or an inter-position (here, called a middle range position) of adjacent two range positions, the manual valve 90 is in a hydraulic pressure supply stop state in which neither the FWD/C hydraulic chamber 41 nor the REV/B hydraulic chamber 42 is supplied with the hydraulic pressure. Therefore, the forward-reverse switching mechanism 4 (i.e. CVT 5A) is brought into a neutral state (a power non-transmission state).

Further, when the MG 3 is used as the driving source and a no-signal state (a signal-absence state) including the cases where the selector lever 9 is positioned at the N-range position and at the middle range position as described above occurs, the motor control unit 10M controls a rotation speed of the MG 3 to be constant regardless of an accelerator pedal depression operation. Since if the manual valve 90 is in the power non-transmission state of the hydraulic pressure supply stop state, an external load is not applied to the MG 3, the rotation speed and also an output torque of the MG 3 are kept constant.

[3. Detection of No-Signal Abnormality of Inhibitor Switch]

Detection of no-signal abnormality (signal-absence abnormality) of the inhibitor switch 14, which is unique to the present control device, will be explained.

The integrated controller 10 has a function of detecting the no-signal abnormality of the inhibitor switch 14. When the no-signal state in which the signal is not outputted from the inhibitor switch 14 occurs, the integrated controller 10 outputs an engagement command for the second clutch 4a to engage, and judges from this engagement state of the second clutch 4a whether or not this no-signal state is an abnormality (failure) of poor contact (contact failure) of electric contact of the inhibitor switch 14 or breakage of an electric signal line from the inhibitor switch 14.

Thus, the integrated controller 10 has, as function elements, a signal judgment unit (a signal judgment means) 10A that judges a signal state from the inhibitor switch 14, an engagement control unit (an engagement control means) 10B that controls engagement of the second clutch 4a on the basis of a signal judgment, an engagement judgment unit (an engagement judgment means) 10C that judges the engagement of the second clutch 4a during execution of the engagement control, and an abnormality determination unit (an abnormality determination means) 10D that if the engagement is judged, determines (fixes or ascertains) that the inhibitor switch 14 is in the no-signal abnormality.

The signal judgment unit 10A judges whether or not the no-signal state in which the signal is not outputted from the inhibitor switch 14 continues for a first predetermined time or more. The first predetermined time in this case is set on the basis of a time for which the selector lever 9 is positioned at the middle range position in a normal operation by the driver without consideration of a case where the driver stops the selector lever operation in the middle of the range selection operation.

That is, when the driver operates the selector lever 9 and changes the shift range, since the selector lever 9 is shifted through a position (the middle range position) between adjacent two shift range positions at which the inhibitor switch 14 is in the no-signal state, the no-signal state occurs. In order to exclude this occurrence of no-signal state by driver's normal range change operation, a continuation of the first predetermined time or more of the no-signal state is set as a condition.

A duration time (or a continuation time) for which the no-signal state continues by driver's normal range change operation is a few time (e.g. about 1 sec. at the longest). In the present embodiment, the first predetermined time is set to a time (for instance, about 2 sec.) determined by taking account of a margin for a time of the no-signal state by the normal range change operation.

When it can be predicted that the no-signal state continues for the first predetermined time or more and the occurrence of the no-signal state is not caused by the normal range change operation as described above, the integrated controller 10 performs the engagement control of the second clutch 4a, and judges the abnormality of the poor contact (contact failure) of the electric contact of the inhibitor switch 14 and the breakage of the electric signal line from the inhibitor switch 14 from the engagement state of the second clutch 4a.

First, a principle of the judgment of the no-signal abnormality of the inhibitor switch 14 will be explained. As shown in FIG. 2, supplying the hydraulic pressure (working fluid)

to the hydraulic chamber of the second clutch 4a requires that the electromagnetic valve 82a is in a hydraulic pressure supply state and also the manual valve 90 is in a hydraulic pressure supply state. As described above, when the selector lever 9 is positioned at a drive range position (the D-range position or the R-range position), the manual valve 90 is in a state in which the hydraulic pressure is supplied to the hydraulic chamber of the second clutch 4a, whereas when the selector lever 9 is positioned at the N-range position or the middle range position, the manual valve 90 is in a state in which the supply of the hydraulic pressure to the hydraulic chamber of the second clutch 4a is interrupted.

Therefore, in a case where the no-signal state of the inhibitor switch 14 occurs due to the fact that the selector lever 9 is positioned at the middle range position, the manual valve 90 is in the state in which the supply of the hydraulic pressure to the hydraulic chamber of the second clutch 4a is interrupted. And, even if the electromagnetic valve 82a is brought into the hydraulic pressure supply state, the hydraulic pressure is not supplied to the hydraulic chamber of the second clutch 4a, and even elimination of backlash of the second clutch 4a cannot be possible, and as a matter of course, the slip-engagement of the second clutch 4a cannot be possible.

On the other hand, if the second clutch 4a is slip-engaged in consequence of that the electromagnetic valve 82a is brought into the hydraulic pressure supply state, the manual valve 90 is in the state in which the hydraulic pressure is supplied to the hydraulic chamber of the second clutch 4a. That is, it is possible to judge that the selector lever 9 is positioned at the drive range position. In this case, a situation is such that even though the selector lever 9 is positioned at the drive range position, the no-signal state of the inhibitor switch 14 occurs, and thus the no-signal abnormality state of the inhibitor switch 14 can be judged.

From such principle, the engagement control unit 10B performs the engagement control (also called "checking control (or finding control)", since checking or finding whether or not the second clutch 4a is engaged is carried out), and the engagement judgment unit 10C judges whether or not the second clutch 4a is engaged by this engagement control. If the engagement judgment unit 10C judges that the second clutch 4a is engaged, the abnormality determination unit 10D determines (fixes or ascertains) that the no-signal abnormality occurs in the inhibitor switch 14.

In the following description, the engagement control unit 10B, the engagement judgment unit 10C and the abnormality determination unit 10D will be explained in detail.

The engagement control unit 10B brings the second clutch 4a into a disengagement state when the no-signal state of the inhibitor switch 14 occurs. Subsequently, when the signal judgment unit 10A judges that the no-signal state continues for the first predetermined time or more, the engagement control unit 10B engagement-controls the second clutch (the forward clutch or the reverse brake of the forward-reverse switching mechanism 4) 4a from the disengagement state toward an engagement direction. In this engagement control, the engagement control unit 10B controls a solenoid (a second clutch solenoid) of the electromagnetic valve 82a of the second clutch pressure regulation unit 82, and the chamber (the FWD/C hydraulic chamber 41 or the REV/B hydraulic chamber) of the second clutch 4a is supplied with the hydraulic pressure (the working fluid).

At this time, first, in order to bring the second clutch 4a into a state just before contact (just before slip-engagement), the engagement control unit 10B performs a backlash elimination control that preliminarily supplies (pre-charges) the working fluid to the chamber of the second clutch 4a. Then, when elimination of the backlash is completed by this backlash elimination control, in order to slip-engage the second clutch 4a, the engagement control unit 10B performs a slip control that supplies the working fluid to the chamber of the second clutch 4a.

The engagement judgment unit 10C judges whether or not the second clutch 4a is engaged during execution of the engagement control. In the present embodiment, when the engagement judgment unit 10C determines (fixes or ascertains) that the second clutch 4a is in a slip-engagement state, the engagement judgment unit 10C judges that the second clutch 4a is engaged. Here, the engagement judgment unit 10C performs this determination of the slip-engagement state of the second clutch 4a by focusing attention on a state of the output torque of the driving source (in this case, the motor/generator 3) and a state of the rotation speed of the driving source (in this case, the motor/generator 3).

In a case where the MG 3 is used as the driving source, since a load is applied to the MG 3 when the second clutch 4a is brought into the slip-engagement state from the disengagement state, the motor control unit 10M increases the output torque of the MG 3 and controls the MG 3 so as to keep a constant rotation speed. Therefore, if a change of increase in the output torque of the MG 3 is detected during execution of the engagement control of the engagement control unit 10B, a start of the slip-engagement of the second clutch 4a from the disengagement state can be judged.

As a slip amount (an input and output rotation difference or an input and output rotation speed ratio) is gradually decreased after start of the slip-engagement of the second clutch 4a, the load applied to the MG 3 is increased and also the output torque of the MG 3 is increased. When the second clutch 4a reaches a slip-engagement state of a target slip amount (a target input and output rotation difference or a target input and output rotation speed ratio), in a case where a remaining capacity of the battery 31 is sufficient, a constant amount of load is applied to the MG 3, and the output torque of the MG 3 becomes a value corresponding to this load.

Therefore, a judgment threshold value (a torque judgment threshold value) of the output torque of the MG 3 is set according to the target slip amount. Then, if the output torque of the MG 3 is equal to or greater than the torque judgment threshold value, it is possible to judge that the second clutch 4a is in the slip-engagement state. However, in order to determine this slip-engagement state, a continuation of a second predetermined time or more of a state in which the output torque of the MG 3 is equal to or greater than the torque judgment threshold value is set as a condition. Then, the slip-engagement state is determined by this condition.

On the other hand, in a case where the remaining capacity of the battery 31 is not sufficient, even if the second clutch 4a reaches the slip-engagement state of the target slip amount and a constant amount of load is applied to the MG 3, the output torque of the MG 3 cannot become a value corresponding to this load, and the MG 3 cannot output the output torque against this load. The rotation speed of the MG 3 is then decreased.

In this case, a judgment threshold value (a rotation judgment threshold value) of rotation speed of the MG 3 is set according to the target slip amount. Then, if the rotation speed of the MG 3 is equal to or less than the rotation judgment threshold value, it is possible to judge that the second clutch 4a is in the slip-engagement state. Here, the rotation speed of the MG 3 can be accurately obtained through the inverter 32. Therefore, in the present embodiment, when the rotation speed of the MG 3 is equal to or less than the rotation judgment threshold value, the engagement judgment unit 10C immediately judges that the second clutch 4a is in the slip-engagement state.

The abnormality determination unit 10D determines (fixes or ascertains) that the inhibitor switch 14 is in the no-signal abnormality, when the engagement judgment unit 10C determines (fixes or ascertains) that the second clutch 4a is in the slip-engagement state.

Further, the abnormality determination unit 10D determines (fixes or ascertains) that the inhibitor switch 14 is in the no-signal abnormality, when the engagement judgment unit 10C does not determine (fix or ascertain) that the second clutch 4a is in the slip-engagement state, but determines that the no-signal state of the inhibitor switch 14 continues for a third predetermined time, which is longer than the first predetermined time, or more.

This third predetermined time is set with consideration given to a duration time (or a continuation time) of the middle range position of the case where the driver stops the selector lever operation at the middle range position in the middle of the range selection operation. Since it is assumed that the continuation time of this case also has a limitation (e.g. about a few tens of seconds), the third predetermined time is set to time of length based on this limitation time (for instance, about a few tens of seconds). That is, when the no-signal state of the inhibitor switch 14 continues for the third predetermined time or more, the abnormality determination unit 10D does not judge that the driver stops the selector lever operation at the middle range position, but judges that the inhibitor switch 14 is in the no-signal abnormality.

[4. Operation and Effect]

Figure 3:
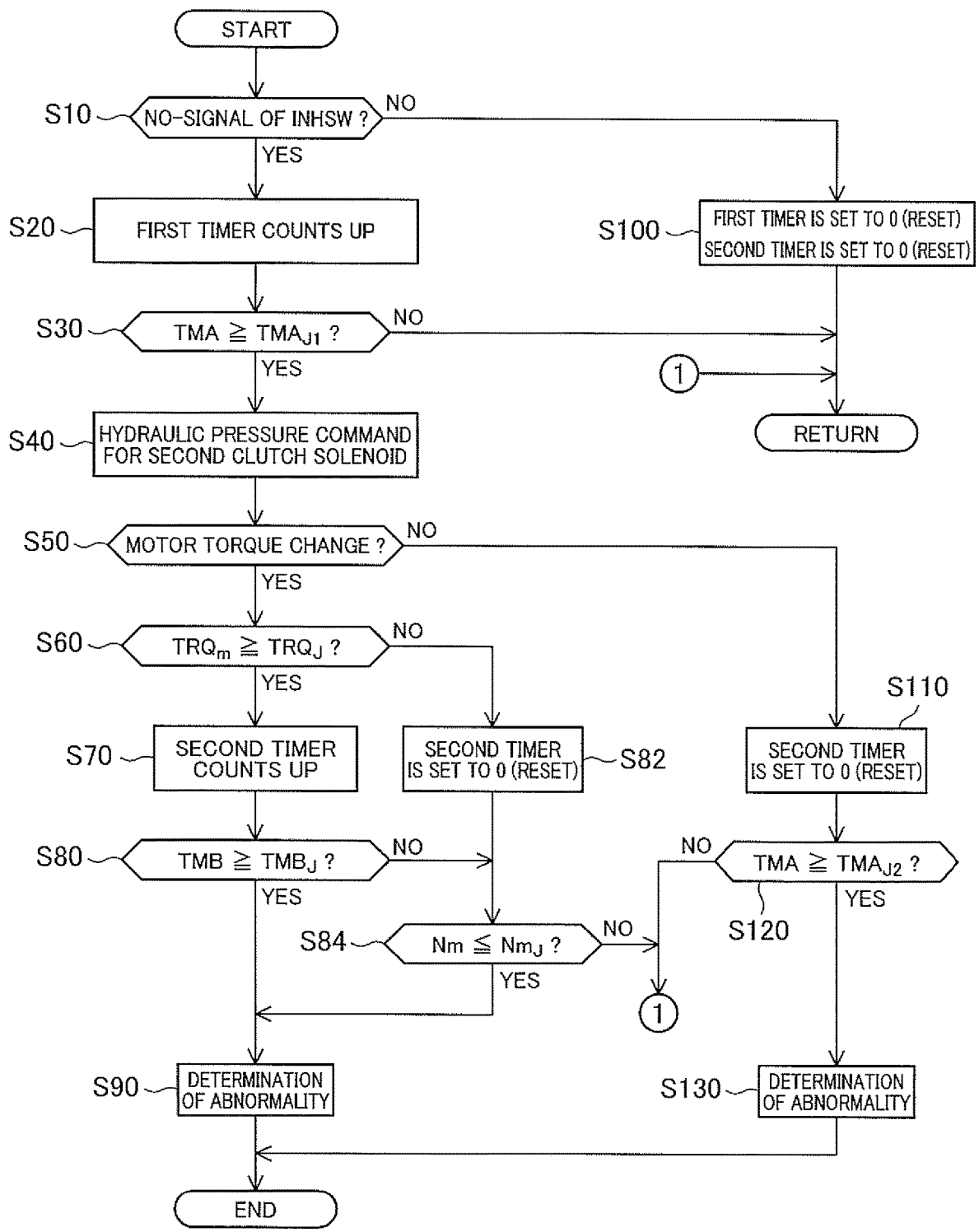
FIG. 3 is a flow chart for explaining a detection process by an abnormality detection device for the automatic transmission, according to the embodiment of the present invention.

Since the abnormality detection device for the automatic transmission according to the embodiment of the present invention is configured as described above, it is possible to detect the no-signal abnormality of the inhibitor switch 14, for instance, by a flow chart in FIG. 3. Here, the flow chart starts when an on-operation of a key switch of the vehicle is performed, and is repeated at a predetermined cycle period. The flow chart ends when the no-signal abnormality of the inhibitor switch 14 is detected or when an off-operation of the key switch of the vehicle is performed.

As shown in FIG. 3, first, a judgment is made as to whether or not the inhibitor switch (INHSW) 14 is in the no-signal state (step S10). If the inhibitor switch 14 is not in the no-signal state, a first timer and a second timer are each set to 0 (i.e. reset) if these timer are in operation, whereas the first timer and the second timer are kept at 0 if these timer are not in operation (step S100), then the routine proceeds to RETURN.

On the other hand, if the inhibitor switch 14 is in the no-signal state, the first timer counts up (step S20). Then, a judgment is made as to whether or not a count value TMA of the first timer becomes a judgment threshold value TMAJ1 or more (step S30). The judgment threshold value TMAJ1 is a value corresponding to the first predetermined time. If the count value TMA of the first timer is not the judgment threshold value TMAJ1 or more, a possibility that the occurrence of the no-signal state is caused by the normal range change operation is strong, then the routine proceeds to RETURN.

On the other hand, if the count value TMA of the first timer is the judgment threshold value TMAJ1 or more, it can be predicted that the occurrence of the no-signal state is not caused by the normal range change operation, and a hydraulic pressure command for the second clutch solenoid (CL2SOL) is outputted (step S40). That is, the command for the solenoid (the second clutch solenoid) of the electromagnetic valve 82a of the second clutch pressure regulation unit 82 to supply the hydraulic pressure to the hydraulic chamber of the second clutch 4a is outputted.

Subsequently, a judgment is made as to whether or not the increase change occurs in a motor torque (the output torque of the MG 3) (step S50). If the increase change does not occur in the motor torque, the second timer is set to 0 (i.e. reset) (step S110). That is, if the second timer already operates, the second timer is set to 0 (reset), whereas if the second timer does not operate yet, the second timer is kept at 0. Then, a judgment is made as to whether or not the count value TMA of the first timer becomes a judgment threshold value TMAJ2 or more (step S120).

Here, since the second timer counts up at after-mentioned step S70, the case where the second timer already operates at step S110 corresponds to a case where YES is judged at steps S50 and S60 and also NO is judged at steps S80 and S84 at the last control cycle.

The judgment threshold value TMAJ2 is a value corresponding to the third predetermined time (a few tens of seconds). If the count value TMA of the first timer is not the judgment threshold value TMAJ2 or more, a possibility that the occurrence of the no-signal state is caused by the stop of driver's selector lever operation at the middle range position is strong, then the routine proceeds to RETURN.

In a case where even though the selector lever 9 is positioned at the drive range position, the no-signal of the inhibitor switch 14 occurs, elimination of the backlash of the second clutch 4a is carried out by and according to the hydraulic pressure command at step S40, and subsequently, the slip-engagement is started. Therefore, the load is applied to the MG 3 through the second clutch 4a and the increase change occurs in the motor torque well before the count value TMA of the first timer is the judgment threshold value TMAJ2 or more.

In a case where the no-signal of the inhibitor switch 14 occurs, if the remaining capacity of the battery 31 is sufficient, a constant amount of load is applied to the MG 3 when the second clutch 4a reaches the target slip state, and the output torque of the MG 3 becomes a value corresponding to this load, then this state is maintained. Therefore, in this case, a count value TMB of the second timer becomes a judgment threshold value TMBJ or more shortly.

When the increase change occurs in the motor torque, a judgment is made as to whether or not a motor torque TRQm becomes a torque judgment threshold value TRQJ or more (step S60). If the motor torque TRQm is the torque judgment threshold value TRQJ or more, the second timer counts up (step S70), and a judgment is made as to whether or not the count value TMB of the second timer is the judgment threshold value TMBJ or more (step S80).

Here, if it is judged that the count value TMB of the second timer is the judgment threshold value TMBJ or more, the unit determines (fixes or ascertains) that the inhibitor switch 14 is in the no-signal abnormality (step S90). If it is judged that the count value TMB of the second timer is not the judgment threshold value TMBJ or more, a judgment is made as to whether or not a motor rotation speed Nm is a rotation judgment threshold value NmJ or less (step S84).

As described above, it is possible to judge that the second clutch 4a is in the slip-engagement state when the motor torque TRQm is equal to or greater than the torque judgment threshold value TRQJ. However, in order to surely judge this slip-engagement state, a continuation of the judgment threshold value TMBJ or more of the count value TMB of the second timer, i.e. a continuation of the second predetermined time or more of the state in which the motor torque TRQm is equal to or greater than the torque judgment threshold value TRQJ, is set as a condition. Then, the slip-engagement state is determined by this condition.

On the other hand, if the remaining capacity of the battery 31 is not sufficient, even if the second clutch 4a is in the slip state and a constant amount of load is applied to the MG 3, the output torque of the MG 3 cannot increase to a value corresponding to this load. The motor rotation speed Nm is then decreased. Because of this, although the motor torque TRQm does not become the torque judgment threshold value TRQJ or more, the motor rotation speed Nm is decreased and becomes the rotation judgment threshold value NmJ or less.

In this case, the routine proceeds to step S82 from step S60, and the second timer is set to 0 (i.e. reset). That is, if the second timer operates, the second timer is set to 0 (reset), whereas if the second timer does not operate, the second timer is kept at 0. Then, the routine proceeds to step S84. At step S84, a judgment is made as to whether or not the motor rotation speed Nm is the rotation judgment threshold value NmJ or less. If it is judged that the motor rotation speed Nm is the rotation judgment threshold value NmJ or less, the unit determines (fixes or ascertains) that the inhibitor switch 14 is in the no-signal abnormality (step S90).

Next, an example in which the state in which the motor torque TRQm is equal to or greater than the torque judgment threshold value TRQJ continues for the second predetermined time or more (the count value TMB of the second timer becomes the judgment threshold value TMBJ or more) and the unit determines that the inhibitor switch 14 is in the no-signal abnormality through steps 60 to S80 will be explained with reference to a time chart of FIG. 4.

Figure 4:
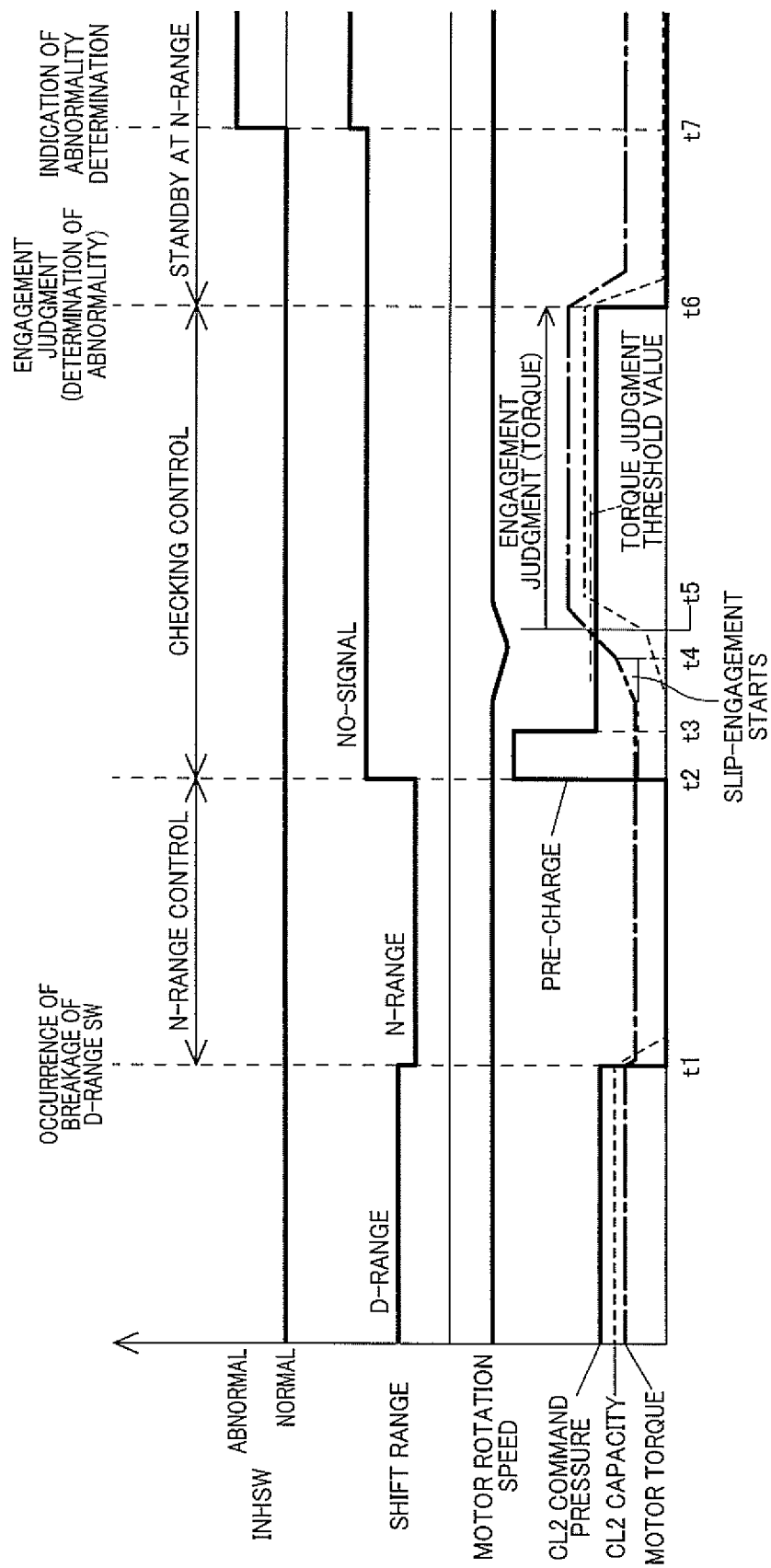
FIG. 4 is a time chart for explaining an abnormality judgment process by the abnormality detection device for the automatic transmission, according to the embodiment of the present invention.

As shown in FIG. 4, when the breakage occurs in a D-range switch (D-range SW) of the inhibitor switch 14 at time t1 in a situation in which the selector lever 9 is set at the drive range (the D-range), since the inhibitor switch 14 is in the no-signal state, the integrated controller 10 performs an operation corresponding to a case where a selection range is the N-range. That is, a command pressure (a CL2 command pressure) for the second clutch 4a is outputted so as to disengage the second clutch 4a, and the torque is controlled such that the rotation speed of the MG 3 is kept at a constant rotation speed.

Then, at time t2 at which the first predetermined time elapses from the occurrence of the no-signal state, by performing the engagement control (the checking control), checking whether or not the second clutch 4a is engaged is carried out. First, the backlash elimination control is carried out by supplying the working fluid to the chamber of the second clutch 4a by the pre-charge from time t2. Subsequently, at time t3, the control is shifted to a slip-engagement control that supplies a predetermined pressure to the chamber of the second clutch 4a. When the second clutch 4a starts to slip-engage, since the motor torque starts to increase (at time t4), the start of the slip-engagement of the second clutch 4a can be judged from this increase change of the motor torque.

The motor torque increases and becomes the torque judgment threshold value or more at time t5. Then, at time t6 at which this state continues for the second predetermined time, it is judged that the second clutch 4a is in the slip-engagement state, and the unit determines (fixes or ascertains) that the inhibitor switch 14 is in the no-signal abnormality. After that (at time t7), the engagement control (the checking control) is terminated, and a message indicating that the inhibitor switch 14 is in the no-signal abnormality is indicated on a warning lamp. Here, time from time t1 to time t6 is about a few seconds.

On the other hand, an example in which the remaining capacity of the battery 31 is not sufficient and the motor rotation speed Nm is decreased and becomes the motor rotation judgment threshold value NmJ or less, then the unit determines that the inhibitor switch 14 is in the no-signal abnormality through steps 60, S82 and S84 will be explained with reference to a time chart of FIG. 5.

Figure 5:
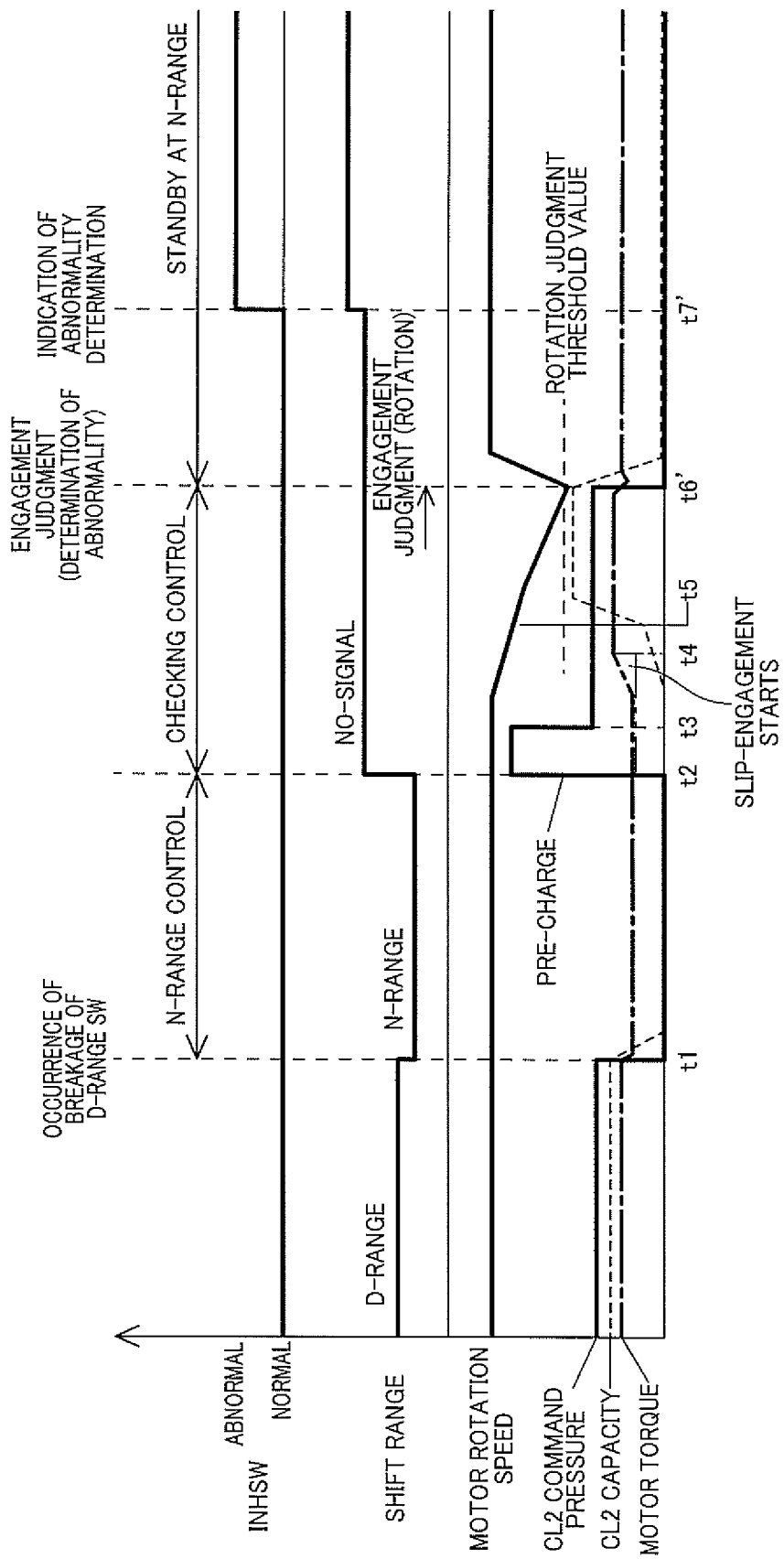
FIG. 5 is a time chart for explaining an abnormality judgment process by the abnormality detection device for the automatic transmission, according to the embodiment of the present invention.

As shown in FIG. 5, in this case, at time t2 at which the first predetermined time elapses from the occurrence of the no-signal state, the engagement control (the checking control) is performed. And, at time t4, the motor torque starts to increase, then the start of the slip-engagement of the second clutch 4a can be judged. However, after that, the increase of the motor torque does not continue, and the motor torque does not become the torque judgment threshold value or more. However, the decrease of the motor rotation speed Nm starts, and the motor rotation speed Nm becomes the motor rotation judgment threshold value NmJ or less at time t6', then it is judged that the second clutch 4a is in the slip-engagement state, and the unit determines (fixes or ascertains) that the inhibitor switch 14 is in the no-signal abnormality. After that (at time t7'), the engagement control (the checking control) is terminated, and a message indicating that the inhibitor switch 14 is in the no-signal abnormality is indicated on the warning lamp. Here, time from time t1 to time t6' is about a few seconds.

As explained above, according to the present abnormality detection device, when the no-signal state of the inhibitor switch 14 continues for the first predetermined time or more, the checking control that engagement-controls the second clutch 4a from the disengagement state toward the engagement direction is performed. And, when the second clutch 4a is engaged, the unit determines that the inhibitor switch 14 is in the no-signal abnormality. It is therefore possible to detect the no-signal abnormality of the inhibitor switch 14 in an extremely short time.

Further, since the slip control is used as the engagement control upon performing the checking control, an engagement shock is suppressed, and it is possible to detect the no-signal abnormality of the inhibitor switch 14 without giving an odd or awkward feeling to the driver.

In addition, in the case where it is not possible to detect the no-signal abnormality of the inhibitor switch 14 by the checking control, using a known-method, when the no-signal state continues for the third predetermined time, which is longer than the first predetermined time, or more, the unit determines (fixes or ascertains) that the range detector is in the no-signal abnormality. It is therefore possible to surely detect the no-signal abnormality.

Although the embodiment of the present invention has been explained, the present embodiment is one of examples of the present invention, and the structure or configuration of the present embodiment includes all design modifications and equivalents belonging to the technical scope of the present invention.

For instance, in the above embodiment, since the present invention focuses attention on the change of the output torque of the driving source and the decrease of the rotation speed of the driving source for the judgment of the engagement of the clutch (the second clutch 4a), it is possible to judge the engagement of the clutch 4a in various situations. However, the judgment of the engagement of the clutch 4a can be possible by focusing attention on either one of the change of the output torque of the driving source and the decrease of the rotation speed of the driving source. In this case, the judgment of the engagement of the clutch 4a can be possible in a certain situation.

The invention claimed is:

1. An abnormality detection device for an automatic transmission, which detects abnormality of a range detector, comprising:
    an automatic transmission connected to a driving source of a vehicle through a clutch;
    a range detector that, when a selector lever of the automatic transmission is operated to any range position, detects a selected range and outputs a detection signal;
    a manual valve that works with the selector lever, the manual valve configured to, when the selector lever is positioned at a drive range position, engage the clutch and bring the automatic transmission into a power transmission state, and when the selector lever is positioned at a range position except the drive range position, disengage the clutch and bring the automatic transmission into a power non-transmission state;
    an engagement control unit configured to, when a no-signal state in which the signal is not outputted from the range detector continues for a first predetermined time or more, control engagement of the clutch from a disengagement state toward an engagement direction;
    an engagement judgment unit configured to judge the engagement of the clutch during execution of the engagement control; and
    an abnormality determination unit configured to, when it is judged that the clutch is engaged by the engagement judgment unit, determine that the range detector is in a no-signal abnormality that indicates that no signal is outputted from the range detector.

2. The abnormality detection device for the automatic transmission as claimed in claim 1, wherein:
    the engagement control includes a backlash elimination control that eliminates backlash of the clutch and a slip control that slip-engages the clutch after the backlash elimination control, and
    when the engagement judgment unit determines that the clutch is in a slip-engagement state, the engagement judgment unit judges that the clutch is engaged.

3. The abnormality detection device for the automatic transmission as claimed in claim 1, wherein:
    by a fact that a state in which an output torque of the driving source changes as compared with an output torque of the driving source before performing the engagement control continues for a second predetermined time or more after judgment of a start of the slip-engagement of the clutch, the engagement judgment unit determines that the clutch is in the slip-engagement state.

4. The abnormality detection device for the automatic transmission as claimed in claim 1, wherein:
    by a fact that a rotation speed of the driving source decreases to a predetermined rotation speed or less after judgment of a start of the slip-engagement of the clutch, the engagement judgment unit determines that the clutch is in the slip-engagement state.

5. The abnormality detection device for the automatic transmission as claimed in claim 1, to wherein:
    the driving source is an electric motor, and
    the abnormality detection device further comprises a motor control unit configured to control the electric motor, and wherein
    the motor control unit operates the electric motor during execution of the engagement control, and when a rotation speed of the electric motor decreases during operation of the electric motor, the motor control unit performs a feedback control so as to recover the rotation speed of the electric motor.

6. The abnormality detection device for the automatic transmission as claimed in claim 1, wherein:
    when the no-signal state in which the signal is not outputted from the range detector continues for a third predetermined time, which is longer than the first predetermined time, or more, even if the engagement of the clutch is not judged by the engagement judgment unit, the abnormality determination unit determines that the range detector is in the no-signal abnormality that indicates that no signal is outputted from the range detector.

* * * * *